(12) United States Patent
Grady et al.

(10) Patent No.: US 7,542,604 B2
(45) Date of Patent: Jun. 2, 2009

(54) SYSTEM AND METHOD FOR IMAGE SEGMENTATION BY SOLVING AN INHOMOGENOUS DIRICHLET PROBLEM

(75) Inventors: Leo Grady, Yardley, PA (US); Tolga Tasdizen, Salt Lake City, UT (US); Ross Whitaker, Salt Lake City, UT (US)

(73) Assignees: Siemens Medical Solutions USA, Inc., Malvern, PA (US); University of Utah Research Foundation, Salt Lake City, UT (US)

( * ) Notice: Subject to any disclaimer, the term of this patent is extended or adjusted under 35 U.S.C. 154(b) by 703 days.

(21) Appl. No.: 11/205,729

(22) Filed: Aug. 17, 2005

(65) Prior Publication Data
US 2006/0050959 A1    Mar. 9, 2006

Related U.S. Application Data

(60) Provisional application No. 60/604,520, filed on Aug. 26, 2004.

(51) Int. Cl.
*G06K 9/34* (2006.01)
(52) U.S. Cl. .................................................. 382/173
(58) Field of Classification Search ....................... None
See application file for complete search history.

(56) References Cited

U.S. PATENT DOCUMENTS

| 6,718,063 B1* | 4/2004 | Lennon et al. ............ 382/224 |
| 6,744,923 B1* | 6/2004 | Zabih et al. .............. 382/226 |
| 2004/0008886 A1* | 1/2004 | Boykov .................... 382/173 |
| 2004/0086185 A1* | 5/2004 | Sun ......................... 382/224 |

* cited by examiner

*Primary Examiner*—Matthew C Bella
*Assistant Examiner*—Yuzhen Ge
(74) *Attorney, Agent, or Firm*—Donald B. Paschburg; F. Chau & Associates, LLC (57) ABSTRACT

A method of segmenting a digitized image includes marking a subset of pixels in an image, defining edge conductances between each pair of adjacent pixels in the image based on the intensity difference of each said pixel pair, associating a probability potential with each unmarked pixel, and using a multigrid method to solve for the probability potentials for each unmarked pixel, wherein a restriction operator from the image grid to a coarse grid is calculated from a conductance-weighted average of the conductances on the image grid, the coarse grid conductances are calculated from the image grid conductances using a $\Delta$-Y conversion, and the multigrid prolongation operator is calculated using a conductance-weighted interpolation of the coarse grid conductances.

22 Claims, 5 Drawing Sheets

SYSTEM AND METHOD FOR IMAGE SEGMENTATION BY SOLVING AN INHOMOGENOUS DIRICHLET PROBLEM

CROSS REFERENCE TO RELATED UNITED STATES APPLICATIONS

This application claims priority from "A Conductance Multigrid Solver for Computing Multilabel Random Walker Probabilities", U.S. Provisional Application No. 60/604,520 of Grady, et al., filed Aug. 26, 2004, the contents of which are incorporated herein by reference.

"This invention was made with government support under Grant No. CCR0092065 awarded by the National Science Foundation. The Government has certain rights to this invention."

TECHNICAL FIELD

This invention is directed to automated and semi-automated segmentation, filtration, and colorization of digitized images.

DISCUSSION OF THE RELATED ART

One goal of automated medical image analysis is how to best take advantage of input from the technician or medical practitioner who will be performing the analysis. The current state-of-the art is such that few automated image analysis techniques can be applied fully autonomously with reliable results. Consequently, the practitioner should evaluate the results of any automated process. In general, this person is currently performing the analysis manually. The goal of the automation is to shorten the time and improve the reliability of the analysis.

Frequently a medical image acquisition device is used for multiple medical indications and studies. In this case the goal of image analysis varies with the patient symptoms and history. For example, a cardiac image can admit several "correct" segmentations depending on the nature of the region of interest, such as the entire heart or a specific ventricle or atria. The knowledge of the goal for the analysis is entirely with the user. However, by specifying the number of segments and by providing small samples of each segment the goal of the segmentation can be better defined for an automated approach.

One approach to semi-automatic image segmentation involves the use of a random walker on a grid. Assuming that a medical practitioner has provided K labeled voxels as seed points, one seeks to determine the probability that a random walker starting at an unlabeled voxel reaches each of the seed points. One algorithm for performing this calculation, the multilabel random walker (MRW) algorithm disclosed in this inventor's copending application titled "System and Method for Multi-Label Image Segmentation", U.S. application Ser. No. 11/029,442, filed Jan. 5, 2005, the contents of which are incorporated herein by reference, requires the solution to a large, sparse, system of linear equations. Multigrid and multilevel methods for the solution of large, sparse, systems of linear equations have gained popularity in recent years. However, the inability of current methods to simultaneously handle a fixed grid size, inhomogeneous coefficients and internal boundary conditions have made the existing body of techniques unsuitable for the current application.

SUMMARY OF THE INVENTION

Exemplary embodiments of the invention as described herein generally include methods and systems for solving discrete Laplace/Poisson/Diffusion equations with Dirichlet boundary conditions on a lattice given by the distribution of electric potentials on the nodes of an electrical circuit with resistors representing the inverse of the weights (i.e., the weights represent conductance) and the "boundary conditions" given by voltage sources fixing the electric potential at the "boundary nodes". Circuit theory terminology can be used to describe the algorithm, with a potential indicating the probability that a walker starting at a given node (pixel) first reaches a seed point. One calculates the probability that a random walker starting at the pixel first reaches a seed by solving the circuit theory problem that corresponds to a discrete analog of the Dirichlet problem. Those seed points belonging to labels other than one considered are grounded (potential set to 0) and a unit voltage source with ground that fixes the s-labeled seeds to have a unit potential is established. The electric potentials established at each unlabeled node provide the probabilities that a walker originating from that node will first reach the seed with label s. These electric potentials can be calculated through the solution of a system of sparse linear equations. The full K-tuple can be calculated by finding the potentials established through switching "on" (providing a unit voltage source to) each labeled collection of nodes and switching "off" (grounding) the remaining labeled nodes. Therefore, K-1 systems of linear equations need to be solved. By linearity (i.e., the principle of superposition in circuit theory), the potentials so calculated sum to unity. Thus, one can avoid solving one of the systems by subtracting the sum of the calculated potentials from unity to find the last entry in the full K-tuple. The multigrid methods disclosed herein also have application to solving the anisotropic diffusion equation with no seed points, wherein a backward Euler approximation can be used to define a linear system to be solved.

According to one aspect of the invention, there is provided a method for segmenting a digitized image comprising the steps of providing a digitized image comprising a plurality of intensities corresponding to a domain of pixels on a grid, marking a subset of pixels in the image, defining edge conductances between each pair of adjacent pixels in the image based on the intensity difference of each said pixel pair, associating a probability potential with each unmarked pixel, and using a multigrid method to solve for the probability potentials for each unmarked pixel, wherein a restriction operator from the image grid to a coarse grid is calculated from a conductance-weighted average of the conductances on the image grid, the coarse grid conductances are calculated from the image grid conductances using a $\Delta$-Y conversion, and the multigrid prolongation operator is calculated using a conductance-weighted interpolation of the coarse grid conductances.

According to a further aspect of the invention, the probability potential for each unmarked pixel represents the probability that a random walker starting from said pixel reaches a marked pixel.

According to a further aspect of the invention, the probability that a random walker starting from an unmarked pixel reaches a marked pixel is calculated for each marked pixel.

According to a further aspect of the invention, each said edge conductance $w_{ij}$ for an edge connecting a pixel $v_i$ to pixel $v_j$ is determined by $$w_{ij} = \exp(-\beta(g_i - g_j)^2),$$

where $g_i$ and $g_j$ are the intensities of pixels i and j, respectively, and $\beta$ is a free parameter.

According to a further aspect of the invention, the method comprises representing said image by a Laplacian matrix L indexed by pixel pairs, wherein an element $L_{ij}$ for pixels i and j is defined by $$L_{ij} = \begin{cases} d_i & \text{if } i = j, \\ -w_{ij} & \text{if } i \text{ and } j \text{ represent adjacent nodes,} \\ 0 & \text{otherwise,} \end{cases}$$

where $d_i = \Sigma w_{ij}$, for all edges incident on pixel i, decomposing L as $$L = \begin{bmatrix} L_M & B \\ B^T & L_U \end{bmatrix},$$

wherein $L_M$ is the Laplacian for the marked pixels, $L_U$ is the Laplacian for the unmarked pixels, and B comprises those elements of L that are left over, representing the probability potential for each pixel i with respect to a marked pixel s by $x_i^s$, representing each marked pixel j by a label function $Q(j) = s$ where s is an integer in the range $0 < s \leq K$ where K is the number of marked pixels, defining a marked vector for each label s at each marked pixel j by $$m_j^s = \begin{cases} 1 & \text{if } Q(j) = s, \\ 0 & \text{if } Q(j) \neq s, \end{cases}$$

wherein the probability potentials for each unmarked pixel can be determined by solving $$L_U x^s = -B m^s.$$

According to a further aspect of the invention, the probability potentials for each unmarked pixel can be determined by solving $L_U X = -BM$, wherein X is a matrix whose columns are defined by each vector $x^s$, and M is a matrix whose rows are given by each vector $m^s$.

According to a further aspect of the invention, a pixel is assigned to a segment of a marked node according to $\max_s (x_i^s)$.

According to a further aspect of the invention, said prolongation operator from a point $x^1(i, j)$ on the coarse grid to a point on the fine grid $x^0$ is defined by the transformations $$x^0(2i, 2j) = x^1(i, j) \; \forall \; i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a node and their corresponding weights.

According to a further aspect of the invention, said restriction operator from a point on the fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a node and their corresponding weights, and the factors $d_E$, $d_W$, $d_N$, $d_S$ denote the corresponding degrees of the neighboring nodes.

According to a further aspect of the invention, the conductance $c_{AB}$ between nodes A and B in a coarse grid is defined by selecting every other node from the fine grid is defined to be:

$$c_{AB} = \frac{p_1 p_2}{\alpha} + \frac{p_3 p_4}{\beta} + \frac{\left(c_6 + \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

where $c_1, \ldots, c_{12}$ are the conductances between nodes A and B on a 3×3 grid subset of the fine grid, $$p_1 = \frac{c_1 c_3}{c_1 + c_3}, \; p_2 = \frac{c_2 c_5}{c_2 + c_5}, \; p_3 = \frac{c_8 c_{11}}{c_8 + c_{11}}, \; p_4 = \frac{c_{12} c_{10}}{c_{12} + c_{10}}, \text{ and}$$

$$\alpha = p_1 + c_4 + p_2, \quad \beta = p_3 + c_9 + p_4.$$

According a another aspect of the invention, there is provided a method of segmenting a digitized image comprising the steps of providing a digitized image comprising a plurality of intensities corresponding to a domain of pixels on a grid, defining edge conductances between each pair of adjacent pixels in the image based on the intensity difference of each said pixel pair, using a multigrid method to solve for a probability potential for each pixel, wherein a restriction operator from a point on the fine grid $x^0$ to a point $x^1(i, j)$ on the coarse grid is calculated from a conductance-weighted average of the conductances defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a node and their corresponding weights, and the factors $d_E$, $d_W$, $d_N$, $d_S$ denote the corresponding degrees of the neighboring nodes, wherein a prolongation operator from a point $x^1(i, j)$ on the coarse grid to a point on the fine grid $x^0$ is calculated from a conductance-weighted interpolation of the coarse grid conductances defined by the transformations $$x^0(2i, 2j) = x^1(i, j) \forall\, i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a node and their corresponding weights, and wherein the conductance $c_{AB}$ between nodes A and B in a coarse grid are calculated from the image grid conductances using a $\Delta$-Y conversion defined by selecting every other node from the fine grid according to the formula $$c_{AB} = \frac{p_1 p_2}{\alpha} + \frac{p_3 p_4}{\beta} + \frac{\left(c_6 + \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

wherein $c_1, \ldots, c_{12}$ are the conductances between nodes A and B on a 3%3 grid subset of the fine grid, $$p_1 = \frac{c_1 c_3}{c_1 + c_3},\ p_2 = \frac{c_2 c_5}{c_2 + c_5},\ p_3 = \frac{c_8 c_{11}}{c_8 + c_{11}},\ p_4 = \frac{c_{12} c_{10}}{c_{12} + c_{10}},\ \text{and}$$

$$\alpha = p_1 + c_4 + p_2, \quad \beta = p_3 + c_9 + p_4.$$

According to a further aspect of the invention, the method comprises marking a subset of pixels in the image, wherein said probability potential is associated with each unmarked pixel, and wherein the probability potential for each unmarked pixel represents the probability that a random walker starting from said pixel reaches a marked pixel.

According to another aspect of the invention, there is provided a program storage device readable by a computer, tangibly embodying a program of instructions executable by the computer to perform the method steps for segmenting a digitized image.

DETAILED DESCRIPTION OF THE PREFERRED EMBODIMENTS

Exemplary embodiments of the invention as described herein generally include systems and methods for applying a multigrid solver to a multilabel random walker image segmentation algorithm.

In the multigrid framework, given knowledge at certain pixels, termed seeds, of a certain quantity of interest (e.g., object labels, grayscale intensities or colors), appropriate quantities are assigned to the unlabeled pixels that reflect the spatial structure of the image. The approach is to treat the seed pixels as Dirichlet boundary conditions (despite being internal to the domain), allow the pixel intensities to define the coefficients (weights) and then solve the Laplace equation (or Poisson equation) to find the quantities at the unlabeled nodes. This approach respects weak (or absent) object boundaries, has provable robustness to noise and admits interpretation in the context of a random walk in the domain. The probability a random walker first reaches a seed point is equivalent to the solution to the Dirichlet problem with boundary conditions at the locations of the seed points and the seed point in question fixed to unity, while the others are set to zero.

The language of graph theory is suitable for problems formulated on a discrete space, such as a digitized image. A graph is a pair $G=(V;E)$ with vertices (nodes) $v \in V$ and edges $e \in E \subseteq V \times V$. An edge, $e$, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$. The degree of a vertex is $d_i = \Sigma w(e_{ij})$ for all edges $e_{ij}$ incident on $v_i$. If $w_{ij}$ is interpreted as the bias affecting a random walker's choice, then $w_{ij} > 0$. In the context of 2D image processing, the graph nodes are taken as the image pixels, which lie on a rectangular, 4-connected, grid. Image intensities can be converted into edge weights (i.e., diffusion constants) through many different methods. One commonly used weighting function is the Gaussian weighting function given by $w_{ij} = \exp(-\beta(g_i - g_j)^2)$, where $g_i$ indicates the image intensity at pixel i. Another possible weighting function would maximize the entropy of the resulting weights. Although these values may be interpreted as diffusion constants, they shall be referred to herein as weights.

The discrete Laplacian matrix can be defined as $$L_{v_i v_j} = \begin{cases} d_{v_i} & \text{if } i = j, \\ -w_{ij} & \text{if } v_i \text{ and } v_j \text{ are adjacent nodes,} \\ 0 & \text{otherwise} \end{cases}$$

where $L_{v_i v_j}$ is used to indicate that the matrix L is indexed by vertices $v_i$ and $v_j$. The solution to the combinatorial Laplace equation with [0,1] boundary conditions on nodes $v_0$, $v_N$ satisfies $$L \begin{bmatrix} 0 \\ x \\ 1 \end{bmatrix} = \begin{bmatrix} -\rho \\ 0 \\ \rho \end{bmatrix},$$

where x is the vector representing the potentials of the internal nodes and $\rho$ is the effective conductance between the boundary nodes [0,1].

Given a set of pixels subject to Dirichlet boundary conditions, the vertices can be partitioned into two disjoint sets, $V_M$ (marked/seed nodes) and $V_U$ (unmarked nodes) such that $V_M \cup V_U = V$ and $V_M \cap V_U = 0$. The Laplacian can then be decomposed and reordered into the form $$L = \begin{bmatrix} L_M & B \\ B^T & L_U \end{bmatrix},$$

corresponding to the marked/unmarked sets. Here, $L_U$ is the Laplacian for the unmarked nodes, $L_M$ is the Laplacian for the marked nodes, and B (and its transpose $B^T$) comprise those elements of L that are left over. Fixing some of the nodes as "boundary" nodes results in their removal from the Laplacian matrix and incorporation into the right hand side. This formulation can be reduced to solving $$L_U x_U = f,$$

for $x_U$ in the presence of some right hand side, $f$, that depends on the application. In the context of potential theory, the quantities $x_U$ can be referred to as the potentials for the unmarked set. The potentials of the marked set are assumed known and fixed.

The function $f$ can be determined by assigning a probability (potential) $x_i^s$ at each node, $v_i$ for each label s. A set of labels for the seed points can be defined as a function $Q(v_j)=s$ for all $v_j \in V_M$, where s is an integer in the range $0 < s \leq K$, the number of labeled (i.e. marked) nodes. A marked vector can be defined for each label s, at node $v_j \in V_M$ as $$m_j^s = \begin{cases} 1 & \text{if } Q(v_j) = s, \\ 0 & \text{if } Q(v_j) \neq s. \end{cases}$$

The solution to the combinatorial Dirichlet problem may be found by solving $$L_u x^s = -B m^s,$$

which is a sparse, symmetric, positive-definite, system of linear equations with $|V_U|$ number of equations and the number of nonzero entries equal to $2|E|$, where E is the number of edges. Since $L_U$ is guaranteed to be nonsingular for a connected graph, the solution, $x^s$, is guaranteed to exist and be unique. Therefore, the potentials for all the labels may be found by solving the system $$L_U X = -BM,$$

where X has columns taken by each $x^s$ and M has columns given by each $m^s$. There are K-1 sparse linear systems to solve, where K is the total number of labels.

This system has some practical properties. First, if an "interpolation" is desired between the solution for a particular image and the neutral solution, this may be achieved through the addition of a constant to the weights. This situation might occur if the image data was known to be very poor and an almost semi-manual segmentation was desired by the medical practitioner. Second, an ideal weighting function would produce weights, such that the presence of independent random noise at the pixel level would produce uncorrelated multiplicative noise at the level of the weights. If such a weighting function were used, then the expected value of the potentials (and hence, the solution) in the presence of independent noise would equal the potentials found in the presence of no noise. The weighting function used above does convert additive pixel noise to multiplicative noise on the weights. However, those weights are not, in general, uncorrelated. Finally, the segmentation obtained with this algorithm in the case of pure noise (and presumably very close to pure noise) is the neutral segmentation, which seems appropriate. Proofs of these properties can be found in this inventor's copending application, "System and Method for Multi-Label Image Segmentation", discussed above.

The following two properties are discrete analogues of properties of continuous harmonic functions and may be seen directly by viewing the solution to the combinatorial Dirichlet problem as a solution to the discrete Laplace equation (with Dirichlet boundary conditions), where the potential of each unlabeled node must satisfy $$x_i^s = \frac{1}{d_i} \sum_{e_{i,j} \in E} w(e_{ij}) x_j^s$$

where the $x_j^s \in V$ (i.e., may include seed points). (1) There exists a potential $0 \leq x_i^s \leq 1$, for all i, s (maximum/minimum principle). (2) The potential of each unlabeled node assumes the weighted average of its neighboring nodes (the mean value theorem).

Multigrid methods can be used to solve linear systems such as the one in question, where L is generated from an elliptic or parabolic partial differential equation (PDE), in a computationally effective manner. Standard iterative methods for solving PDEs, represented discretely as $Au=f$, where u is an unknown, reduce high frequency errors, but not low frequency errors. Multigrid methods can correct for low frequency errors by computing a smooth correction function on a coarse resolution grid and interpolating the correction onto a fine resolution grid to correct the current iteration of u. A prolongation operation serves to linearly interpolate from the coarse grid to the fine grid, while a restriction operator serves to map fine grid node values to the coarse grid. In general, there are two branches of the method: geometric and algebraic. Algebraic multigrid approaches aspire to a "black box" method that can apply the technique to an arbitrary linear system. In contrast, geometric methods evolved out of attempts to solve PDEs on a rectilinear domain (especially elliptic and parabolic systems) where it may be assumed that coarsened versions of the operator also represent rectilinear grids. Although discrete in nature, and therefore equally defined on arbitrary graphs, application of these methods to standard images results in a Laplacian operator with a sparsity structure that represents a grid. Multigrid method involve: (1) specifying the restriction operator; (2) specifying the prolongation operator; and (3) producing a coarsened operator. The prolongation and restriction operators are formally adjoint to each other, where two operators, A and A*, are adjoint if $(Ax,y)=(x,A^*y)$ is satisfied. For a finite, linear, operator represented by matrix A, the adjoint is given by $A^* = A^T$.

A multigrid method according to an embodiment of the invention can be summarized as follows. A new iteration $u_i$ of the unknown u is calculated on a fine grid. The restriction operator R to the error ($f - Au_i$) to obtain a coarse grid function $d_i$. A correction $A^{-1} d_i$ is calculated on the coarse grid, and then, using the prolongation operator, is interpolated back to the fine grid by $PA^{-1} d_i$. This correction is added to the current iteration $u_i$: $u_i' = u + PA^{-1} d_i$. The next, uncorrected iteration can now be calculated. Note that restriction to coarser grids can be applied recursively by any number of two-grid restriction steps.

The Laplace equation with isotropic weights is a system in which multigrid methods provide significant computational savings over more straightforward methods. However, the multigrid solution to the Laplace equation with spatially varying weights requires non-standard restriction and prolongation operators. In accordance with an embodiment of the invention, conductance-respecting prolongation and restriction operators can be defined by using a conductance-weighted interpolation as the prolongation operator and a conductance-weighted averaging as the restriction operator.

Bilinear interpolation is a standard prolongation operator, often termed the "full weighting" operator. However, this operator does not respect the edge weights and therefore may interpolate over object boundaries. Therefore, according to an embodiment of the invention, a weighted bilinear interpolation is used, with weights given by the edge weights. Specifically, the prolongation operator proceeds in three steps for values at the fine level, $x^0$, and the coarse level, $x^1$. For ease of exposition, a north/south/east/west notation is used to indicate the neighbors of a node and the corresponding weight between them.

$$x^0(2i, 2j) = x^1(i, j) \, \forall \, i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W}$$

In essence, the first step injects the coarse-level solution to the fine grid. The subsequent equations describe a weighted bilinear interpolation over the remaining fine-level pixels. Note that for a unity-weighted (i.e., homogeneous) domain, this operator becomes standard bilinear interpolation.

The restriction operator is defined as the adjoint of the weighted prolongation operator defined above. This adjoint can be written in four steps.

$$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

The factor $d_N$ denotes the degree of the node to the north, etc. Effectively, one can think of this operator as reversing the projection. Note that a unity weighted lattice (i.e., homogeneous domain) would cause the weighted restriction operator above to be a standard "full-weighting" restriction.

Figure 1:
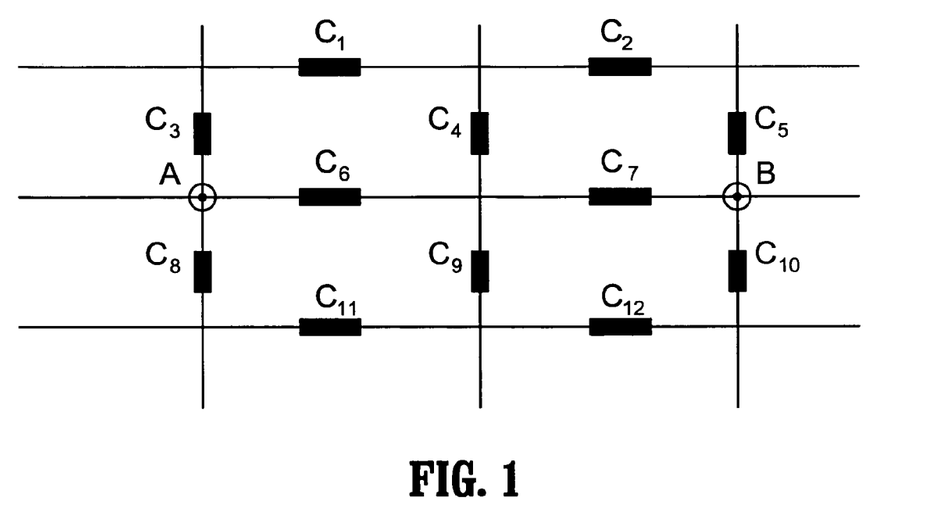
FIG. 1 depicts an exemplary 3%3 section of a grid at a fine grid resolution, according to an embodiment of the invention.
Figure 2:
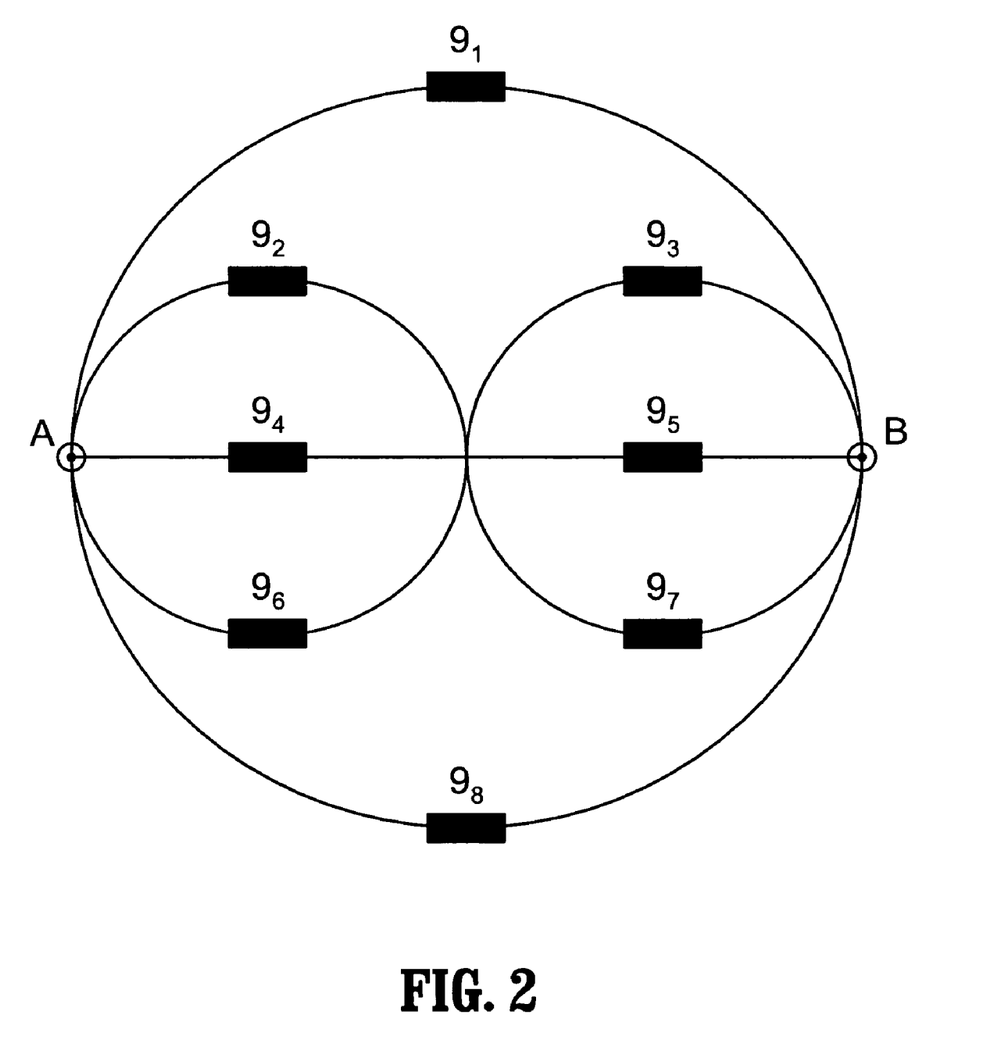
FIG. 2 illustrates the connections between nodes A and B of FIG. 1 as restricted to the 3%3 part of the domain, according to an embodiment of the invention.

According to an embodiment of the invention, a geometric approach uses a restriction template that eliminates every other pixel in an image, and includes a new technique of restricting edge weights of the L operator to the coarser levels. FIG. 1 depicts an exemplary 3%3 section of a grid at a fine grid resolution, where nodes are indicated by the line crossings, and the edge weights are indicated by the black rectangles $c_1, \ldots, c_{12}$. These weights can be regarded as resistances with magnitude equal to $1/w_{ij}$, or conductances equal to $w_{ij}$, for each edge weight $w_{ij}$. These connection can be seen as an electrical circuit, with each edge associated with a conductance (or resistance) value. At the coarser grid level, the nodes marked as A and B will remain, while the rest of the nodes will be discarded. FIG. 2 illustrates the connections between nodes A and B as restricted to the 3%3 part of the domain, where the exterior of the 3%3 section is ignored, and with the effective conductances indicated by the black rectangles $q_1, \ldots, q_8$. Calculating the coarse grained edges weights is then reduced to computing the effective conductance between A and B, which may then be assigned as the edge weight in the coarse grid. The Δ-Y conversions from electrical circuit theory can be used to convert the circuit in FIG. 1 into the circuit of FIG. 2. An effective conductance value between nodes A and B can be computed using standard series and parallel circuit computations. With the Δ-Y conversions applied to the top and bottom of the circuit in FIG. 1, the effective conductance $c_{AB}$ between A and B in FIG. 2 equals $$c_{AB} = \frac{p_1 p_2}{\alpha} + \frac{p_3 p_4}{\beta} + \frac{\left(c_6 + \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

where $$p_1 = \frac{c_1 c_3}{c_1 + c_3}, \, p_2 = \frac{c_2 c_5}{c_2 + c_5}, \, p_3 = \frac{c_8 c_{11}}{c_8 + c_{11}}, \, p_4 = \frac{c_{12} c_{10}}{c_{12} + c_{10}}, \, \text{and}$$

$$\alpha = p_1 + c_4 + p_2, \, \beta = p_3 + c_9 + p_4.$$

Figure 3:
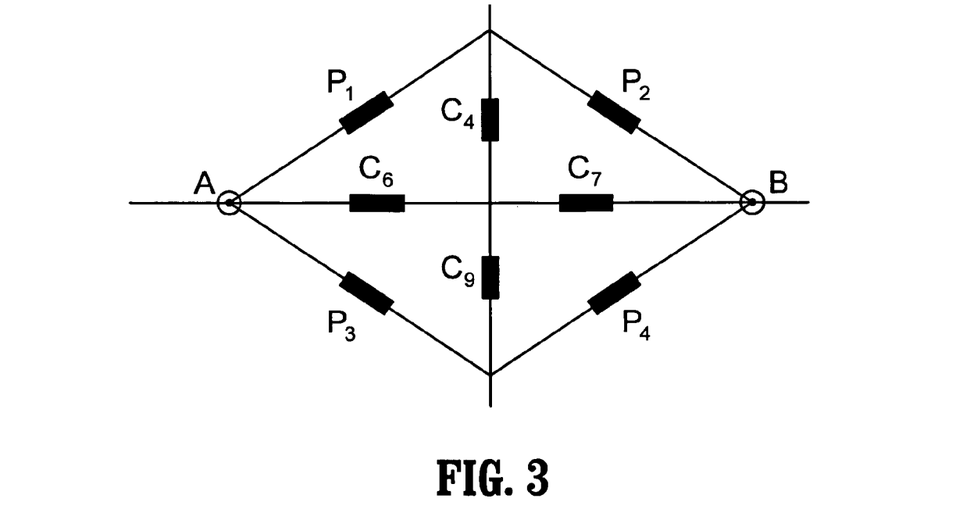
FIG. 3 illustrates an intermediate circuit utilizing the serially summed conductances from FIG. 1.

The intermediate circuit utilizing the serially summed conductances $p_1, \ldots, p_4$ is illustrated in FIG. 3. Edge effects resulting from pixels along the image border can be handled by setting $p_1 = c_4 = p_2 = 0$ and $p_3 = c_9 = p_4 = 0$, although one needs to set 0/0 expressions to be zero. The final circuit, with conductances $q_1, \ldots, q_8$, that results from the Δ-Y conversion is illustrated in FIG. 2. The conductances $q_1, \ldots, q_8$, can be defined by $$q_1 = p_1 p_2/\alpha, \, q_2 = p_1 c_4/\alpha, \, q_3 = c_4 p_2/\alpha, \, q_4 = c_6,$$

$$q_5 = c_7, \, q_6 = p_3 c_9/\beta, \, q_7 = c_9 p_4/\beta, \, q_8 = p_3 p_4/\beta.$$

The conductance between nodes A and B is then calculated by serially adding the parallel sum of $q_2, q_4, q_6$ to the parallel sum of $q_3, q_5, q_7$, and then adding this result in parallel with $q_1$ and $q_8$.

Figure 4:
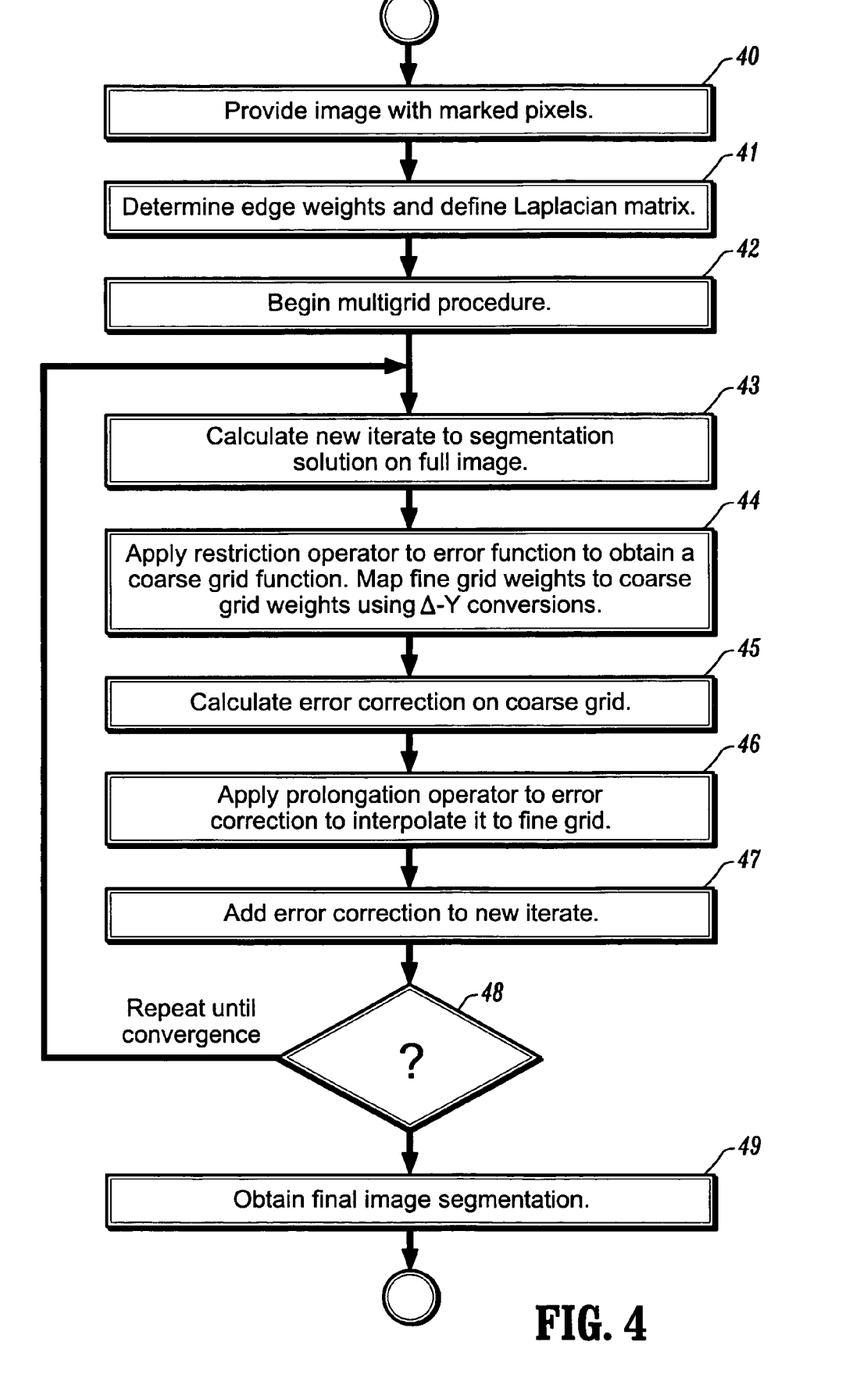
FIG. 4 depicts a flow chart of a multigrid solver according to an embodiment of the invention.

A flow chart of a multigrid solver according to an embodiment of the invention is depicted in FIG. 4. At step 40, in image with a set $V_M$ of marked pixels with K labels is provided, either automatically or through the intervention of a medical practitioner. At step 41, edge weights for the lattice representing the image are defined from the pixel intensities according to $w_{ij} = \exp(-\beta(g_i - g_j)^2)$, where $g_i$ and $g_j$ are the intensities of pixels i, j, respectively. This Gaussian weighting function is exemplary, and other weighting functions can be used and still be within the scope of an embodiment of the invention. With these weighting functions, a Laplacian matrix L can be defined for the segmentation of the image. The segmentation can be determined by solving either $L_u x^s = -Bm^s$, or $L_U X = -BM$, for the unmarked pixels, defined above.

At step 42, the multigrid procedure for determining the segmentation begins. In the following the multigrid procedure will be illustrated using the $L_u x^s = -Bm^s$ formulation of the segmentation, but it is to be understood that the procedure can be applied to solving the $L_U X=-BM$ formulation as well. At step 43, a new iterate to the solution $x_i^s$ is calculated on the full image. At step 44, a restriction operator R is calculated according to the conductance-weighted averaging formulae defined above. This restriction operator is then applied to the error $(-Bm^s-L_u x_i^s)$ to obtain a coarse grid function d. Note that according to another embodiment of the invention, the restriction operator is pre-calculated before beginning the multigrid procedure. The weights of the coarse grid are determined from the weights of the fine grid according to the Δ-Y conversions defined above. The correction $L_U^{-1}d$ is calculated on the coarse grid at step 45, and at step 46, the correction is interpolated back to the fine grid using a conductance-weighted interpolation as the prolongation operator P, as defined above. According to an embodiment of the invention, the prolongation operator is precalculated before beginning the multigrid procedure. At step 47, the error correction $PL_U^{-1}d$ is added to the uncorrected iteration $x_i^s$ to obtain a corrected iteration. At step 48, the procedure returns to step 43 to calculate the next iteration. The steps 43, 44, 45, 46, 47, and 48 are repeated until convergence of the solution. Note that, after convergence, the solution for the $N^{th}$ $x_i^s$ can be determined from $x_i^f = 1 - \Sigma_{s<f} x_i^s$.

At step 49, a final segmentation can be obtained by assigning to each node $v_i$ the label corresponding to the $\max_s(x_i^s)$. Thus, the node vi will be assigned to the segment of the marked node with the maximum probability potential. It is to be understood that although the multigrid technique was illustrated above with a 2-level grid, it can be easily applied to an n-level grid by one skilled in the art.

Figure 6:
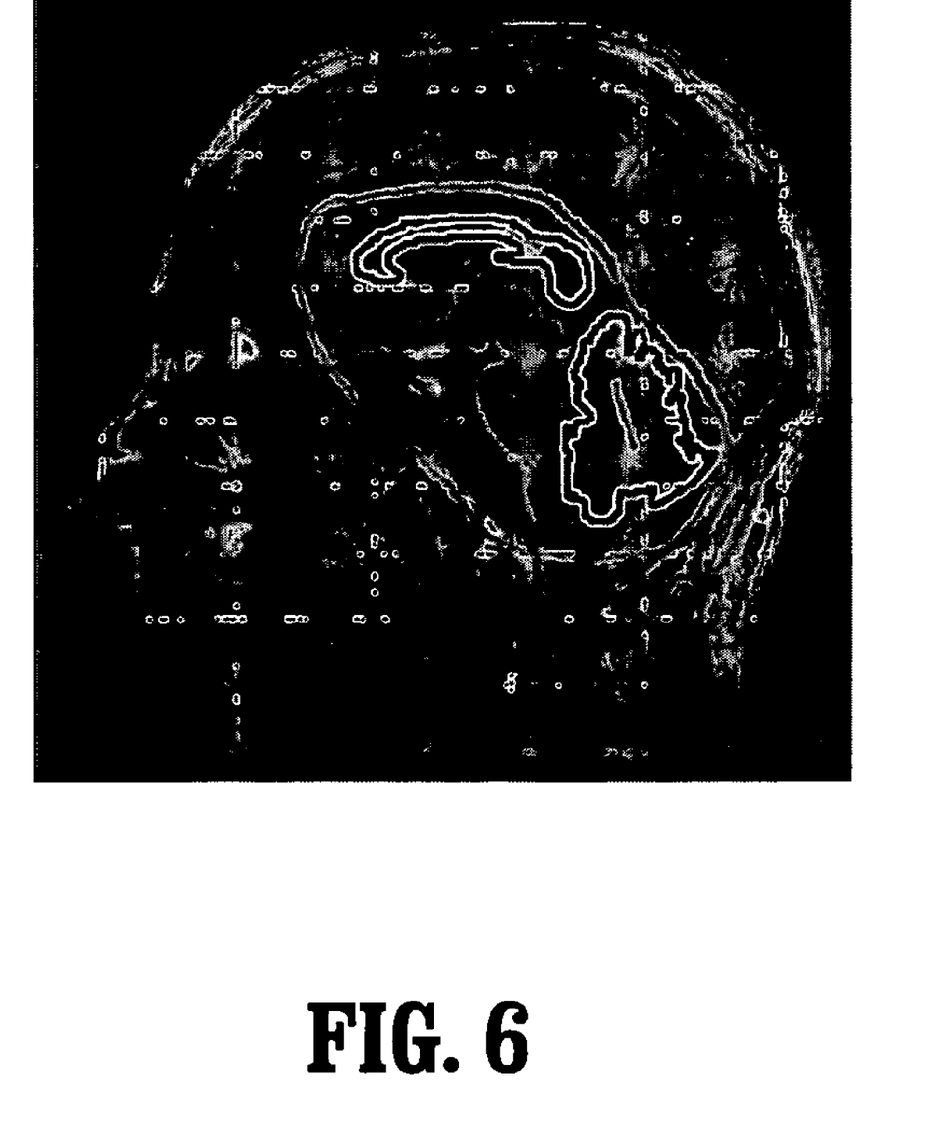
FIG. 6 depicts an example of segmentation obtained from a multilabel algorithm according to an embodiment of the invention.

FIG. 6 depicts an example of segmentation obtained from a multilabel algorithm according to an embodiment of the invention. Gray marks in the image represent the result of user interaction to identify three objects (corpus callosum, cerebellum, and background) for segmentation. These gray marks serve as seeds for the segmentation. The thick black lines indicate the computed segment boundaries. Even though no prior knowledge is incorporated into the multilabel algorithm, the algorithm can correctly segment both objects, despite unusual shapes and textures.

According to another embodiment of the invention, the anisotropic diffusion equation has a similar formulation, with $V_M=0$ and $V_U=V$. In this embodiment, the solution of the combinatorial diffusion requires a solution to $$\frac{dx}{dt} = -tLx,$$

given some time t and an initial distribution $x_0$. A backward Euler approximation can be used to replace this differential equation with a linear system $$\left(\frac{1}{t}I + L\right)x = \frac{1}{t}x_0,$$

which is equivalent to the system presented above, with $$f = \frac{1}{t}x_0$$

and a constant addition to the diagonal of L. Since this formulation typically does not have imposed Dirichlet boundary conditions, a less complicated multigrid approach can be utilized for its solution.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
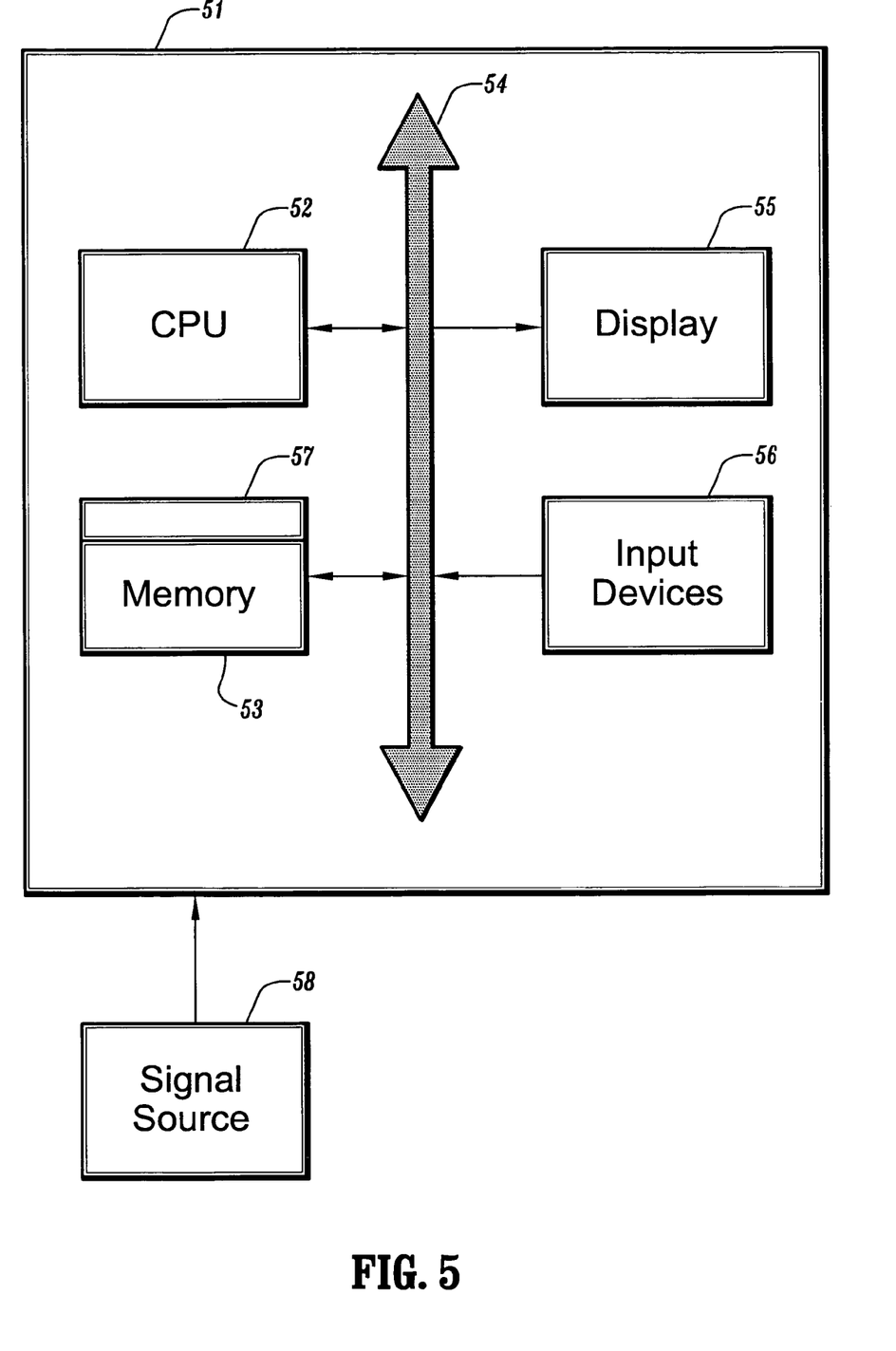
FIG. 5 is a block diagram of an exemplary computer system for implementing a multigrid scheme according to an embodiment of the invention.

FIG. 5 is a block diagram of an exemplary computer system for implementing a multigrid scheme for the multilabel random walker based segmentation according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, tape drive, etc., or a combinations thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of segmenting a digitized image comprising the steps of:

providing a digitized image comprising a plurality of intensities corresponding to a domain of pixels on a grid;

marking a subset of pixels in the image;

defining edge conductances between each pair of adjacent pixels in the image based on the intensity difference of each said pixel pair;

associating a probability potential with each unmarked pixel; and using a multigrid method and a computer to solve for the probability potentials for each unmarked pixel, wherein a restriction operator from the image grid to a coarse grid is calculated from a conductance-weighted average of the edge conductances on the image grid, coarse grid conductances are calculated from the edge conductances using a Δ-Y conversion, and a prolongation operator is calculated using a conductance-weighted interpolation of the coarse grid conductances.

2. The method of claim 1, wherein the probability potential for each unmarked pixel represents the probability that a random walker starting from said pixel reaches a marked pixel.

3. The method of claim 2, wherein the probability that a random walker starting from an unmarked pixel reaches a marked pixel is calculated for each marked pixel.

4. The method of claim 1, wherein each said edge conductance $w_{ij}$ for an edge connecting a pixel $v_i$ to pixel $v_j$ is determined by $$w_{ij} = \exp(-\beta(g_i - g_j)^2),$$

where $g_i$ and $g_j$ are the intensities of pixels i and j, respectively, and $\beta$ is a free parameter.

5. The method of claim 4, further comprising representing said image by a Laplacian matrix L indexed by pixel pairs, wherein an element $L_{ij}$ for pixels i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

where $d_i = \Sigma w_{ij}$ for all edges incident on pixel i, decomposing L as $$L = \begin{bmatrix} L_M & B \\ B^T & L_U \end{bmatrix},$$

wherein $L_M$ is the Laplacian for the marked pixels, $L_U$ is the Laplacian for the unmarked pixels, and B comprises those elements of L that are left over, representing the probability potential for each pixel i with respect to a marked pixel s by $x_i^s$, representing each marked pixel j by a label function Q(j)=s where s is an integer in the range $0 < s \leq K$ where K is the number of marked pixels, defining a marked vector for each label s at each marked pixel j by $$m_j^s = \begin{cases} 1 & \text{if } Q(j) = s, \\ 0 & \text{if } Q(j) \neq s, \end{cases}$$

wherein the probability potentials for each unmarked pixel can be determined by solving $L_U x^s = -Bm^s$.

6. The method of claim 5, wherein the probability potentials for each unmarked pixel can be determined by solving $L_U X = -BM$, wherein X is a matrix whose columns are defined by each vector $x^s$, and M is a matrix whose rows are given by each vector $m^s$.

7. The method of claim 6, wherein a pixel is assigned to a segment of a marked node with a maximum probability potential.

8. The method of claim 1, wherein said grid is a 2-dimensional grid indexed by i and j, wherein said prolongation operator from a point $x^1(i, j)$ on the coarse grid to a point on a fine grid $x^0$ is defined by the transformations $$x^0(2i, 2j) = x^1(i, j) \; \forall \; i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a node and their corresponding weights $w_E, w_W, w_N, w_S$.

9. The method of claim 1, wherein said grid is a 2-dimensional grid indexed by i and j, wherein said restriction operator from a point on a fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a node and their corresponding weights, $w_E, w_W, w_N, w_S$, and the factors $d_E, d_W, d_N, d_S$ denote corresponding degrees of the neighboring nodes.

10. The method of claim 1, wherein the coarse grid conductance $c_{AB}$ between nodes A and B in the coarse grid defined by selecting every other node from a fine grid is defined to be:

$$c_{AB} = \frac{p_1 p_2}{\alpha} + \frac{p_3 p_4}{\beta} + \frac{\left(c_6 + \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

where $c_1, \ldots, c_{12}$ are conductances between nodes A and B on a 3×3 grid subset of the fine grid, $$p_1 = \frac{c_1 c_3}{c_1 + c_3}, \; p_2 = \frac{c_2 c_5}{c_2 + c_5}, \; p_3 = \frac{c_8 c_{11}}{c_8 + c_{11}}, \; p_4 = \frac{c_{12} c_{10}}{c_{12} + c_{10}}, \text{ and}$$

$$\alpha = p_1 + c_4 + p_2, \; \beta = p_3 + c_9 + p_4.$$

11. A method of segmenting a digitized image comprising the steps of:

providing a digitized image comprising a plurality of intensities corresponding to a domain of pixels on a 2-dimensional grid;

defining edge conductances between each pair of adjacent pixels in the image based on the intensity difference of each said pixel pair;

using a multigrid method and a computer to solve for a probability potential for each pixel, wherein a restriction operator from a point on a fine grid $x^0$ to a point $x^1$ on a coarse grid is calculated from a conductance-weighted average of the edge conductances defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein i, j are grid indices, the labels E, W, N, S indicate, respectively, the east/west/north/south neighbors of a node and their corresponding weights, $w_E$, $w_W$, $W_N$, $w_S$ and the factors $d_E$, $d_w$, $d_N$, $d_S$, denote corresponding degrees of the neighboring nodes;

wherein a prolongation operator from a point $x^I(i, j)$ on the coarse grid to a point on the fine grid $x^0$ is calculated from a conductance-weighted interpolation of coarse grid conductances defined by the transformations $$x^0(2i, 2j) = x^1(i, j) \forall\, i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a node and their corresponding weights $W_E$, $W_W$, $W_N$, $W_S$;

and wherein a conductance $c_{AB}$ between nodes A and B in the coarse grid are calculated from the edge conductances using a Δ-Y conversion defined by selecting every other node from the fine grid according to the formula $$c_{AB} = \frac{p_1 p_2}{\alpha} + \frac{p_3 p_4}{\beta} + \frac{\left(c_6 \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

wherein $c_1, \ldots, c_{12}$ are the conductances between nodes A and B on a 3×3 grid subset of the fine grid, $$p_1 = \frac{c_1 c_3}{c_1 + c_3},\; p_2 = \frac{c_2 c_5}{c_2 + c_5},\; p_3 = \frac{c_8 c_{11}}{c_8 + c_{11}},\; p_4 = \frac{c_{12} c_{10}}{c_{12} + c_{10}},$$

and $$\alpha = p_1 + c_4 + p_2,\; \beta = p_3 + c_9 + p_4.$$

12. The method of claim 11, further comprising marking a subset of pixels in the image, wherein said probability potential is associated with each unmarked pixel, and wherein the probability potential for each unmarked pixel represents the probability that a random walker starting from said pixel reaches a marked pixel.

13. A program storage device readable by a computer, tangibly embodying a program of instructions executable by the computer to perform the method steps for segmenting a digitized image comprising the steps of:

providing a digitized image comprising a plurality of intensities corresponding to a domain of pixels on a grid;

marking a subset of pixels in the image;

defining edge conductances between each pair of adjacent pixels in the image based on the intensity difference of each said pixel pair;

associating a probability potential with each unmarked pixel; and using a multigrid method to solve for the probability potentials for each unmarked pixel, wherein a restriction operator from the image grid to a coarse grid is calculated from a conductance-weighted average of the edge conductances on the image grid, coarse grid conductances are calculated from the edge conductances using a Δ-Y conversion, and a prolongation operator is calculated using a conductance-weighted interpolation of the coarse grid conductances.

14. The computer readable program storage device of claim 13, wherein the probability potential for each unmarked pixel represents the probability that a random walker starting from said pixel reaches a marked pixel.

15. The computer readable program storage device of claim 14, wherein the probability that a random walker starting from an unmarked pixel reaches a marked pixel is calculated for each marked pixel.

16. The computer readable program storage device of claim 13, wherein each said edge conductance $w_{ij}$ for an edge connecting a pixel $v_i$ to pixel $v_j$ is determined by $$w_{ij} = \exp(-\beta(g_i - g_j)^2),$$

where $g_i$ and $g_j$ are the intensities of pixels i and j, respectively, and β is a free parameter.

17. The computer readable program storage device of claim 15, the method further comprising representing said image by a Laplacian matrix L indexed by pixel pairs, wherein an element $L_{ij}$ for pixels i and j is defined by $$L_{ij} = \begin{cases} d_i & \text{if } i = j, \\ -w_{ij} & \text{if } i \text{ and } j \text{ represent adjacent nodes}, \\ 0 & \text{otherwise}, \end{cases}$$

where $d_i = \Sigma w_{ij}$ for all edges incident on pixel i, decomposing L as $$L = \begin{bmatrix} L_M & B \\ B^T & L_U \end{bmatrix},$$

wherein $L_M$ is the Laplacian for the marked pixels, $L_U$ is the Laplacian for the unmarked pixels, and B comprises those elements of L that are left over, representing the probability potential for each pixel i with respect to a marked pixel s by $x_i^s$, representing each marked pixel j by a label function Q(j)=s where s is an integer in the range 0<s≦K where K is the number of marked pixels, defining a marked vector for each label s at each marked pixel j by $$m_j^s = \begin{cases} 1 & \text{if } Q(j) = s, \\ 0 & \text{if } Q(j) \neq s, \end{cases}$$

wherein the probability potentials for each unmarked pixel can be determined by solving $L_U x^s = -Bm^s$.

18. The computer readable program storage device of claim 17, wherein the probability potentials for each unmarked pixel can be determined by solving $L_U X = -BM$, wherein X is a matrix whose columns are defined by each vector $x^s$, and M is a matrix whose rows are given by each vector $m^s$.

19. The computer readable program storage device of claim 18, wherein a pixel is assigned to a segment of a marked node with a maximum probability potential.

20. The computer readable program storage device of claim 13, wherein said grid is a 2-dimensional grid indexed by i and j, wherein said prolongation operator from a point $x^1(i, j)$ on the coarse grid to a point on a fine grid $x^0$ is defined by the transformations $$x^0(2i, 2j) = x^1(i, j) \forall i, j$$

$$x^0(2i+1, 2j) = \frac{w_E x_E^0 + w_W x_W^0}{w_E + w_W}$$

$$x^0(2i+1, 2j+1) = \frac{w_N x_N^0 + w_E x_E^0 + w_S x_S^0 + w_W x_W^0}{w_N + w_E + w_S + w_W},$$

wherein the labels E, W, N, S indicate, respectively, the east/west/north/south neighbors of a node and their corresponding weights $W_E$, $W_W$, $W_N$, $W_S$.

21. The computer readable program storage device of claim 13, wherein said grid is a 2-dimensional grid indexed by i and j, wherein said restriction operator from a point on a fine grid $x^0$ to a point $x^1(i, j)$ on the coarse grid is defined by the transformations $$x^0(2i+1, 2j) = x^0(2i+1, 2j) + \frac{w_E x_E^0}{d_E} + \frac{w_W x_W^0}{d_W}$$

$$x^0(2i, 2j+1) = x^0(2i, 2j+1) + \frac{w_N x_N^0}{d_N} + \frac{w_S x_S^0}{d_S}$$

$$x^0(2i, 2j) = x^0(2i, 2j) + \frac{w_N x_N^0}{d_N} + \frac{w_E x_E^0}{d_E} + \frac{w_S x_S^0}{d_S} + \frac{w_W x_W^0}{d_W}$$

$$x^1(i, j) = x^0(2i, 2j)$$

wherein the labels E, W, N, S indicate, respectively, the east/west/north/south neighbors of a node and their corresponding weights $W_E$, $W_W$, $W_N$, $W_S$, and the factors $d_E$, $d_W$, $d_N$, $d_S$ denote corresponding degrees of the neighboring nodes.

22. The computer readable program storage device of claim 13, wherein the coarse grid conductance $c_{AB}$ between nodes A and B in the coarse grid is defined by selecting every other node from a fine grid is defined to be:

$$c_{AB} = \frac{p_1 p_2}{\alpha} + \frac{p_3 p_4}{\beta} + \frac{\left(c_6 + \frac{p_1 c_4}{\alpha} + \frac{p_3 c_9}{\beta}\right)\left(c_7 + \frac{c_4 p_2}{\alpha} + \frac{c_9 p_4}{\beta}\right)}{c_4 + c_6 + c_7 + c_9 - \frac{c_4^2}{\alpha} - \frac{c_9^2}{\beta}}$$

where $c_1, \ldots, c_{12}$ are the conductances between nodes A and B on a 3×3 grid subset of the fine grid, $$p_1 = \frac{c_1 c_3}{c_1 + c_3}, \quad p_2 = \frac{c_2 c_5}{c_2 + c_5}, \quad p_3 = \frac{c_8 c_{11}}{c_8 + c_{11}}, \quad p_4 = \frac{c_{12} c_{10}}{c_{12} + c_{10}},$$

and $$\alpha = p_1 + c_4 + p_2, \quad \beta = p_3 + c_9 + p_4.$$

* * * * *